(12) United States Patent
Christman et al.

(10) Patent No.: US 12,736,974 B2
(45) Date of Patent: Sep. 15, 2026

(54) VISUALIZATION OF PHYSICAL SPACE ROBOT QUEUING AREAS AS NON-WORK LOCATIONS FOR ROBOTIC OPERATIONS

(71) Applicant: Seegrid Corporation, Pittsburgh, PA (US)

(72) Inventors: Andy Christman, Pittsburgh, PA (US); Francine Gemperle, Pittsburgh, PA (US); Atticus Huberts, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 161 days.

(21) Appl. No.: 18/529,236

(22) Filed: Dec. 5, 2023

(65) Prior Publication Data

US 2024/0184302 A1 Jun. 6, 2024

Related U.S. Application Data

(60) Provisional application No. 63/430,170, filed on Dec. 5, 2022.

(51) Int. Cl.
*G05D 1/225* (2024.01)
*G05D 107/70* (2024.01)

(52) U.S. Cl.
CPC ......... *G05D 1/225* (2024.01); *G05D 2107/70* (2024.01)

(58) Field of Classification Search
CPC .......................... G05D 1/225; G05D 2107/70
USPC ........................................................ 701/23
See application file for complete search history.

(56) References Cited

U.S. PATENT DOCUMENTS

| | | | | |
|---|---|---|---|---|
| 8,700,502 | B2 * | 4/2014 | Mountz | G06Q 10/0833 700/226 |
| 9,776,324 | B1 | 10/2017 | Johnson et al. | |
| 10,026,044 | B1 * | 7/2018 | Wurman | G06Q 10/08 |
| 10,029,851 | B1 * | 7/2018 | Durham | B65G 1/1373 |
| 10,089,586 | B2 | 10/2018 | Vestal et al. | |
| 10,981,724 | B2 * | 4/2021 | Lert, Jr. | B65G 1/1373 |
| 11,052,539 | B2 | 7/2021 | Liu | |
| 11,145,206 | B2 | 10/2021 | Russell et al. | |
| 2014/0365258 | A1 * | 12/2014 | Vestal | G05D 1/0274 901/1 |
| 2018/0043533 | A1 | 2/2018 | Johnson et al. | |

(Continued)

OTHER PUBLICATIONS

International Search Report and Written Opinion dated Mar. 13, 2024 issued in International Application No. PCT/US2023/082457.

(Continued)

*Primary Examiner* — Yazan A Soofi
(74) *Attorney, Agent, or Firm* — Onello & Mello PC

(57) ABSTRACT

A system comprises a management system comprising at least one processor configured to define a set of queueing spaces associated with a workspace location for reach of a plurality of locations. In response to a request by an autonomous mobile robot (AMR) for access to the location, the management system is configured to grant access to the requesting AMR if the location is unoccupied or direct the requesting AMR to a queueing space associated with the location if the location is occupied by another AMR. In response to a signal indicating the location has been exited by the other AMR, the management system is configured to send instructions to the requesting AMR granting access to the location.

25 Claims, 6 Drawing Sheets

(56) References Cited

U.S. PATENT DOCUMENTS

| | | | | |
|---|---|---|---|---|
| 2018/0321675 | A1* | 11/2018 | Russell | B60W 30/00 |
| 2021/0048829 | A1* | 2/2021 | Deyle | G05D 1/0274 |
| 2021/0078175 | A1* | 3/2021 | Liu | B25J 9/162 |
| 2022/0414566 | A1* | 12/2022 | Napoli | G06Q 10/06311 |
| 2023/0150139 | A1* | 5/2023 | Debusca | B25J 11/008<br>700/258 |
| 2024/0157556 | A1* | 5/2024 | Haus | G05D 1/646 |
| 2024/0160223 | A1* | 5/2024 | Cesic | B25J 9/162 |

OTHER PUBLICATIONS

Extended European Search Report dated Apr. 23, 2026 issued in European Application No. 23901434.3.

* cited by examiner

VISUALIZATION OF PHYSICAL SPACE ROBOT QUEUING AREAS AS NON-WORK LOCATIONS FOR ROBOTIC OPERATIONS

CROSS REFERENCE TO RELATED APPLICATIONS

The present application claims priority to U.S. Provisional Patent Application 63/430,170, filed Dec. 5, 2022, entitled, Visualization of Physical Space Robot Queuing Areas as Non-Work Locations for Robotic Operations, which is incorporated herein by reference.

The present application may be related to International Application No. PCT/US23/016556 filed on Mar. 28, 2023, entitled A Hybrid, Context-Aware Localization System For Ground Vehicles; International Application No. PCT/US23/016565 filed on Mar. 28, 2023, entitled Safety Field Switching Based On End Effector Conditions In Vehicles; International Application No. PCT/US23/016608 filed on Mar. 28, 2023, entitled Dense Data Registration From An Actuatable Vehicle-Mounted Sensor; International Application No. PCT/U.S. Pat. No. 23,016,589, filed on Mar. 28, 2023, entitled Extrinsic Calibration Of A Vehicle-Mounted Sensor Using Natural Vehicle Features; International Application No. PCT/US23/016615, filed on Mar. 28, 2023, entitled Continuous And Discrete Estimation Of Payload Engagement Disengagement Sensing; International Application No. PCT/US23/016617, filed on Mar. 28, 2023, entitled Passively Actuated Sensor System; International Application No. PCT/US23/016643, filed on Mar. 28, 2023, entitled Automated Identification Of Potential Obstructions In A Targeted Drop Zone; International Application No. PCT/US23/016641, filed on Mar. 28, 2023, entitled Localization of Horizontal Infrastructure Using Point Clouds; International Application No. PCT/US23/016591, filed on Mar. 28, 2023, entitled Robotic Vehicle Navigation With Dynamic Path Adjusting; International Application No. PCT/US23/016612, filed on Mar. 28, 2023, entitled Segmentation of Detected Objects Into Obstructions and Allowed Objects; International Application No. PCT/US23/016554, filed on Mar. 28, 2023, entitled Validating the Pose of a Robotic Vehicle That Allows It To Interact With An Object On Fixed Infrastructure; and International Application No. PCT/US23/016551, filed on Mar. 28, 2023, entitled A System for AMRs That Leverages Priors When Localizing and Manipulating Industrial Infrastructure; International Application No.: PCT/US23/024114, filed on Jun. 1, 2023, entitled System and Method for Generating Complex Runtime Path Networks from Incomplete Demonstration of Trained Activities; International Application No.: PCT/US23/023699, filed on May 26, 2023, entitled System and Method for Performing Interactions with Physical Objects Based on Fusion of Multiple Sensors; International Application No.: PCT/US23/024411, filed on Jun. 5, 2023, entitled Lane Grid Setup for Autonomous Mobile Robots (AMRs); International Application No.: PCT/US23/033818, filed on Sep. 27, 2023, entitled Shared Resource Management System and Method; International Application No.: PCT/US23/079141, filed on Nov. 8, 2023, entitled System And Method For Definition Of A Zone Of Dynamic Behavior With A Continuum Of Possible Actins and Locations Within Same; International Application No.: PCT/US23/078890, filed on Nov. 7, 2023, entitled Method And System For Calibrating A Light-Curtain; International Application No.: PCT/US23/036650, filed on Nov. 2, 2023, entitled System and Method for Optimized Traffic Flow Through Intersections with Conditional Convoying Based on Path Network Analysis; U.S. Provisional Appl. 63/430,184 filed on Dec. 5, 2022, entitled Just in Time Destination Definition and Route Planning; U.S. Provisional Appl. 63/430,182 filed on Dec. 5, 2022, entitled Composable Patterns of Material Flow Logic for the Automation of Movement; U.S. Provisional Appl. 63/430,174 filed on Dec. 5, 2022, entitled Process Centric User Configurable Step Framework for Composing Material Flow Automation; U.S. Provisional Appl. 63/430,195 filed on Dec. 5, 2022, entitled Generation of "Plain Language" Descriptions Summary of Automation Logic; U.S. Provisional Appl. 63/430,171 filed on Dec. 5, 2022, entitled Hybrid Autonomous System Enabling and Tracking Human Integration into Automated Material Flow; U.S. Provisional Appl. 63/430,180 filed on Dec. 5, 2022, entitled A System for Process Flow Templating and Duplication of Tasks Within Material Flow Automation; U.S. Provisional Appl. 63/430,200 filed on Dec. 5, 2022, entitled A Method for Abstracting Integrations Between Industrial Controls and Autonomous Mobile Robots (AMRs); and U.S. Provisional Appl. 63/430,190 filed on Dec. 5, 2022, entitled Configuring a System That Handles Uncertainty with Human and Logic Collaboration in A Material Flow Automation Solution, each of which is incorporated herein by reference in its entirety.

The present application may be related to U.S. patent application Ser. No. 11/350,195, filed on Feb. 8, 2006, U.S. Pat. No. 7,466,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S. Pat. No. 8,864,164, Issued on Oct. 21, 2014, entitled Tugger Attachment; U.S. Design Patent Appl. 29/398,127, filed on Jul. 26, 2011, U.S. Pat. No. D680,142, Issued on Apr. 16, 2013, entitled Multi-Camera Head; U.S. Design Patent Appl. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 17/712,660, filed on Apr. 4, 2022, US Publication Number 2022/0297734, Published on Sep. 22, 2022, entitled Laterally Operating Payload Handling Device; U.S. patent application Ser. No. 16/892,549, filed on Jun. 4, 2020, U.S. Pat. No. 11,693,403, Issued on Jul. 4, 2023, entitled Dynamic Allocation And Coordination of Auto-Navigating Vehicles and Selectors; U.S. patent application Ser. No. 18/199,052, filed on May 18, 2023, Publication Number 2023/0376030, Published on Nov. 23, 2023, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022/0100195, Published on Mar. 31, 2022, entitled Vehicle Object-Engagement Scanning System And Method; U.S. patent application Ser. No. 17/478,338, filed on Sep. 17, 2021, US Publication Number 2022/0088980, Published on Mar. 24, 2022, entitled Mechanically-Adaptable Hitch Guide; U.S. patent application Ser. No. 29/832,212, filed on Mar. 25, 2022, entitled Mobile Robot, each of which is incorporated herein by reference in its entirety.

FIELD OF INTEREST

The present inventive concepts relate to the field of robotics and autonomous mobile robots (AMRs). In particular, the inventive concepts may be related to systems and methods useful for improving efficiency of mobile robot fleet management.

BACKGROUND

Within increasing numbers and types of environments, autonomous vehicles may travel through areas and/or along pathways that are shared with other vehicles and/or pedestrians. Such other vehicles can include other autonomous vehicles, semi-autonomous vehicles, and/or manually operated vehicles. The autonomous vehicles can take a variety of forms and can be referred to using various terms, such as mobile robots, robotic vehicles, automated guided vehicles, and/or autonomous mobile robots (AMRs). In some cases, these vehicles can be configured for operation in an autonomous mode where they self-navigate or in a manual mode where a human directs the vehicle's navigation. Herein, vehicles that are configured for autonomous navigation are referred to as AMRs.

Multiple AMRs may have access to an environment and both the state of the environment and the state of an AMR can be constantly changing. The environment can be within, for example, a warehouse or large storage space or facility and the AMRs can include, but are not limited to, pallet lifts, pallet trucks, and tuggers.

The primary focus for visualizing robotic operations on user interfaces is the work, i.e., the jobs the robots are doing. These jobs are configured by a user as a series of workflow tasks to be performed along a route. However, some portion of time for any mechanical solution is spent in "Utility Locations," these are parking places, charging stations, and service or repair areas that are not part of the workflow. It is critical to successful operations that any mobile robot both spend time in these places/states and that it is recognizable by human users what is happening when a mobile robot is in a utility location.

Mobile robotic systems are generally either performing tasks or not. When not performing tasks, they may be in a variety of different non-work states. Two things are key for human users to understand: (1) if the non-work state is one that makes the robot available for work or not and (2) what is the availability of the fleet (multiple robots doing work against a single application).

For automated robotic systems, setting up intentional use and utility locations for non-work time is key to efficient operations. If the system designers cannot specify what mobile robots should do and where to go when they do not have an active task, then downtime becomes a drag on overall return on investment. For systems that integrate human and automated operations coincident with each other, exposing this information to humans is a key component of efficient use of the automation and overall smooth collaboration between human and robotic systems. If human operators on a warehouse floor do not have access to this information, the overall usefulness of the system and return on investment drops.

Current systems do not model non-work time or visualize it. Systems that enable application designers to specify it in the programming of the application can be useful, but is insufficient for an optimal system.

Prior to the inventive concepts, all visualizations of robot state focused on individual robots and limiting the information to "idle" reporting of state. A "Taxi Stand" has been defined as a place for robots to wait for work. This was a useful concept, but lacked three key things: (1) a way to easily extend this to other non-work locations to the system (e.g., charging station, tech shop, parking lots, etc.); (2) a visual representation and way for human operators to understand it and leverage this information in their operations; and (3) an ability to manage multiple taxi stands, for example, in a facility and/or multiple streams of work to a single taxi stand.

SUMMARY

In accordance with various aspects of the inventive concepts, provided is a system, a management system comprising at least one processor configured to define a set of queueing spaces associated with a workspace location for reach of a plurality of locations; and in response to a request by an autonomous mobile robot (AMR) for access to the location, the management system is configured to grant access to the requesting AMR if the location is unoccupied or direct the requesting AMR to a queueing space associated with the location if the location is occupied by another AMR.

In various embodiments, the management system is further configured to, in response to a signal indicating the location has been exited by the other AMR, send instructions to the requesting AMR granting access to the location.

In various embodiments, the locations are within a warehouse environment and include drop and pick locations.

In various embodiments, the management system is configured to generate computer displays showing status of queuing spaces as being assigned or available.

In various embodiments, the management system is configured to generate computer displays enabling creation of the set of queueing spaces in association with the location.

In various embodiments, the management system is configured to generate computer displays enabling creation of the set of utility locations.

In various embodiments, the utility locations include charging stations, service areas, and non-work idling area.

In various embodiments, the management system is configured to generate computer displays showing status of utility locations.

In accordance with another aspect of the inventive concepts, provided is a method, comprising: a management system comprising at least one processor executing program code to manage traffic at workspace locations, including: defining a set of queueing spaces associated with a workspace location for reach of a plurality of locations; and in response to a request by an autonomous mobile robot (AMR) for access to the location, granting access to the requesting AMR if the location is unoccupied or directing the requesting AMR to a queueing space associated with the location if the location is occupied by another AMR.

In various embodiments, the method further comprises, in response to a signal indicating the location has been exited by the other AMR, sending instructions to the requesting AMR granting access to the location.

In various embodiments, the locations are within a warehouse environment and include drop and pick locations.

In various embodiments, the method further comprises generating computer displays showing status of queuing spaces as being assigned or available.

In various embodiments, the method further comprises generating computer displays enabling creation of the set of queueing spaces in association with the location.

In various embodiments, the method further comprises generating computer displays enabling creation of the set of utility locations.

In various embodiments, the utility locations include charging stations, service areas, and non-work idling area.

In various embodiments, the method further comprises generating computer displays showing status of utility locations.

In accordance with another aspect of the inventive concepts, provided is a computer program product stored in a computer memory and executable by at least one processor to perform a method comprising: defining a set of queueing spaces associated with a workspace location for each of a plurality of locations; and in response to a request by an autonomous mobile robot (AMR) for access to the location, granting access to the requesting AMR if the location is unoccupied or directing the requesting AMR to a queueing space associated with the location if the location is occupied by another AMR.

In various embodiments, the method further comprises, in response to a signal indicating the location has been exited by the other AMR, sending instructions to the requesting AMR granting access to the location.

In various embodiments, the locations are within a warehouse environment and include drop and pick locations.

In various embodiments, the method further comprises, generating computer displays showing status of queuing spaces as being assigned or available.

In various embodiments, the method further comprises, generating computer displays enabling creation of the set of queueing spaces in association with the location.

In various embodiments, the method further comprises, further comprising generating computer displays enabling creation of the set of utility locations.

In various embodiments, the utility locations include charging stations, service areas, and non-work idling area.

In various embodiments, the method further comprises, generating computer displays showing status of utility locations.

BRIEF DESCRIPTION OF THE DRAWINGS

The present inventive concepts will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
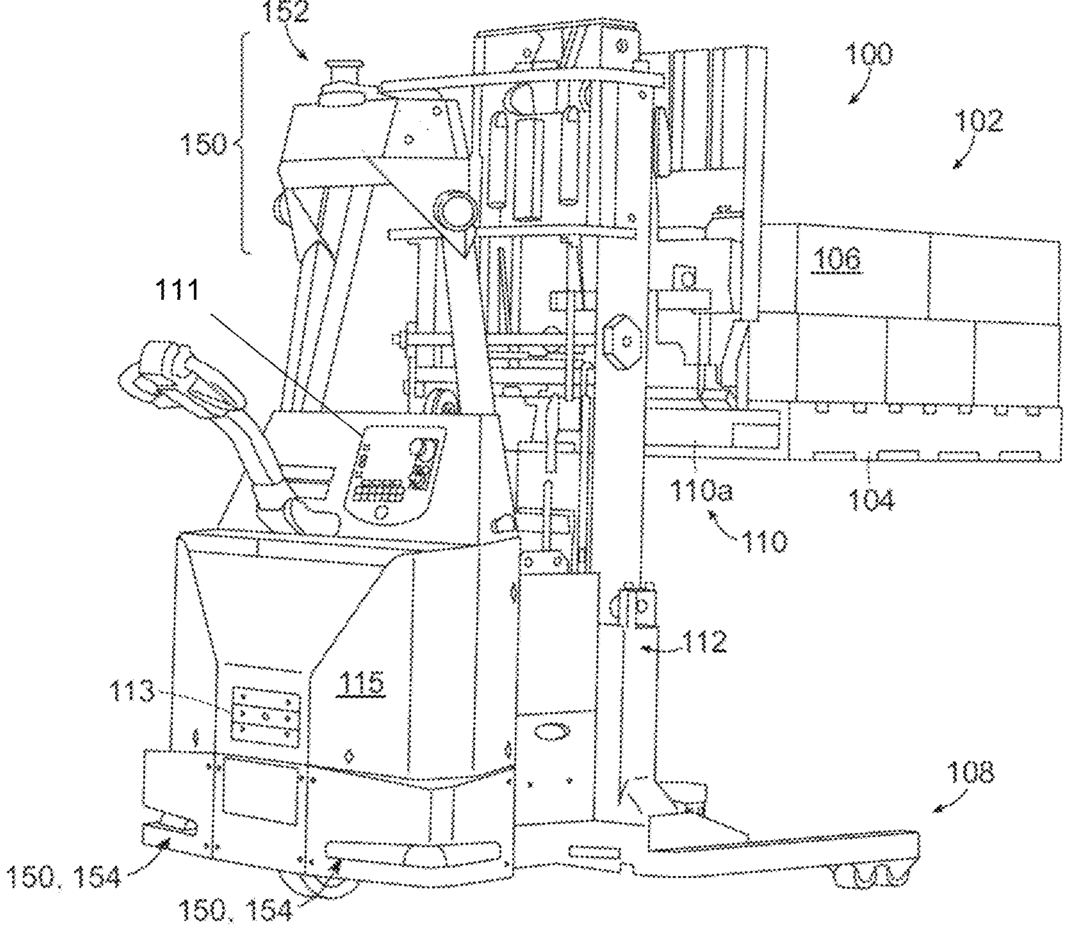
FIG. 1 is a perspective view of an embodiment of an AMR forklift that comprises an embodiment of the systems described herein, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term “and/or” includes any and all combinations of one or more of the associated listed items.

It will be understood that when an element is referred to as being “on” or “connected” or “coupled” to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspects of the inventive concepts, a supervisor system, comprising fleet management functionality, defines a model for visualizing abstractions of "utility" type locations in use during common robot operations. The supervisor can render displays on graphical user interfaces of devices within the environment that show the status of AMRs and, optionally, the status of non-work spaces within the facility, such as assigned or available. The fleet management GUI is a tool for a user operating a mobile device, such as a laptop, tablet, mobile phone, or other portable handheld device having a display and user input devices, and can be an extension of a supervisor and fleet management system that manages and monitors a plurality of robotic vehicles, such as automated mobile robots (AMR) in a warehouse environment.

FIG. 1 is a perspective view of an embodiment of a robotic vehicle in the form of an AMR forklift 100 that comprises features described herein, in accordance with aspects of the inventive concepts.

In this embodiment, AMR 100 includes a payload area 102 configured to transport a pallet 104 loaded with goods 106, as a palletized load. To engage and carry pallet 104, the AMR may include a pair of forks 110, including a first and second fork 110*a, b* (not shown). Outriggers 108 extend from the robotic vehicle in the direction of the forks to stabilize the vehicle, particularly when carrying palletized load 106. AMR 100 can comprise a battery area 112 for holding one or more batteries. In various embodiments, the one or more batteries can be configured for charging via a charging interface 113. AMR 100 can also include a main housing 115 within which various control elements and subsystems can be disposed, including those that enable the robotic vehicle to navigate from place to place.

Forks 110 extend from the AMR in a first direction. The AMR is configured to travel in the first direction and, alternatively, in a second direction. The second direction can be considered opposite to the first direction, understanding that the AMRs have turning capability in both directions.

The AMR 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for path adaptation, including avoidance of detected objects, obstructions, hazards, humans, other robotic vehicles, and/or congestion during navigation. Sensors 150 can include one or more cameras, stereo cameras 152, radars, and/or laser imaging, detection, and ranging (LiDAR) scanners 154. One or more of sensors 150 can form part of a 2D or 3D high-resolution imaging system.

A user interface (UI) 111 can be provided on the AMR or on a computer that communicates with the AMR, such as a laptop, tablet, phablet, desktop, mobile phone, or other such computer device having a user interface. A "wizard" may be generated at or within the UI to assist a user in inputting information necessary for task and/or route planning, e.g., the wizard user interface can present computer displays that guide a user through entering task and route information, and building jobs from job templates. In various embodiments, UI 111 can be used to enter trigger inputs from a order selector, such as a task complete input.

AMR 100 can be configured with the sensing, processing, and memory devices and subsystems necessary and/or useful for executing job templates to perform tasks, in accordance with aspects of the inventive concepts. AMR 100 takes the form of an AMR pallet lift, but the inventive concepts could be embodied in any of a variety of other types of robotic vehicles and AMRs, including, but not limited to, pallet trucks, tuggers, and the like. In other embodiments, the inventive concepts could be applied in other context with robotic vehicle that perform other tasks.

Figure 2:
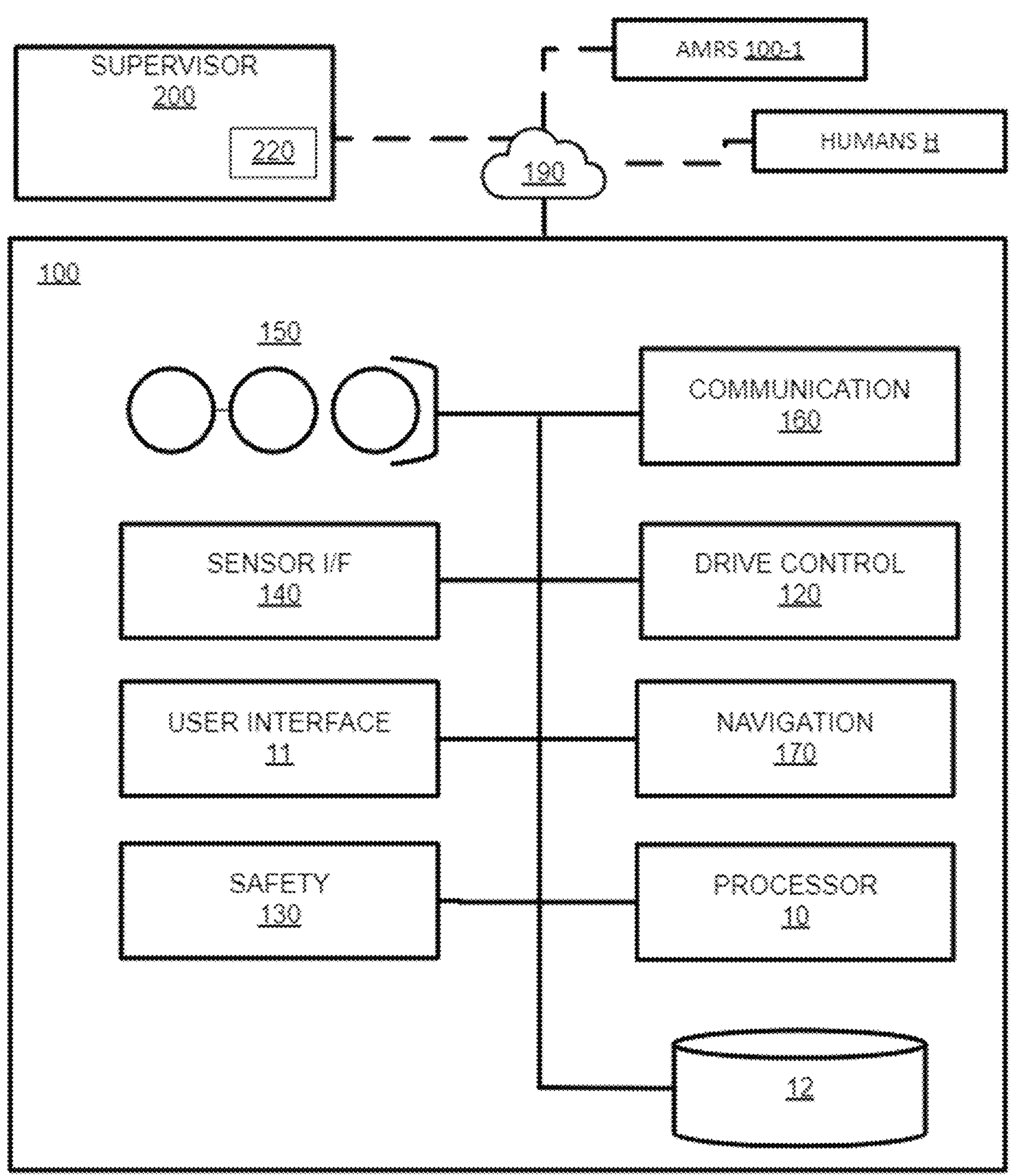
FIG. 2 is a block diagram of a robotic materials flow system in accordance with principles of inventive concepts.

FIG. 2 is a block diagram of components of an embodiment of AMR 100 of FIG. 1 in communication with a supervisor system 200, in accordance with principles of inventive concepts. The embodiment of FIG. 2 is an example; other embodiments of a robotic vehicle can include other components and/or terminology. In the example embodiment shown in FIG. 1, AMR 100 is a warehouse robotic vehicle, which can interface and exchange information with one or more external systems, including supervisor system 200, which can include a fleet management module 220 (collectively "supervisor 200"). In various embodiments, supervisor 200 could be configured to perform, for example, fleet management and monitoring for a plurality of vehicles (e.g., AMRs) and, optionally, other assets within the environment, such as humans with handheld or wearable electronic devices. Supervisor 200 can be local or remote to the environment, or some combination thereof.

As shown in FIG. 2, in example embodiments, AMR 100 includes various functional elements, e.g., components and/or modules, which can be housed onboard, e.g., within housing 115. Such functional elements can include at least one processor 10 coupled to at least one memory 12 to cooperatively operate the vehicle and execute its functions or tasks. Memory 12 can include computer program instructions, e.g., in the form of a computer program code or product, executable by processor 10 to perform functions. Memory 12 can also store various types of data and information. Such data and information can include route data, path data, path segment data, pick data, location data, environmental data, and/or sensor data, as examples, as well as the electronic map of the environment. Memory 12 can also store AMR and/or human performance data.

In this embodiment, processor 10 and memory 12 are shown onboard AMR 100 of FIG. 1, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across supervisor 200, other vehicles, and/or other systems external to the AMR.

The functional elements of AMR 100 can further include a navigation module 170 configured to access environmental data, such as the electronic map, and path information stored in memory 12, as examples. Navigation module 170 can communicate instructions to a drive control subsystem 120 to cause AMR 100 to navigate its path or route within the environment. During vehicle travel, navigation module 170 may receive information from one or more sensors 150, via a sensor interface (I/F) 140, to control and adjust the navigation of the robotic vehicle. For example, sensors 150 may provide sensor data to navigation module 170 and/or drive control subsystem 120 in response to sensed objects and/or conditions in the environment to control and/or alter the robotic vehicle's navigation. As examples, sensors 150 can be configured to collect sensor data related to objects, obstructions, equipment, goods to be picked, hazards, completion of a task, and/or presence of humans and/or other robotic vehicles.

A safety module 130 can also make use of sensor data from one or more of sensors 150, including LiDAR scanners 154, to interrupt and/or take over control of drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause drive control subsystem 120 to stop the vehicle to avoid the hazard.

Sensors 150 can include one or more stereo cameras 152 and/or other volumetric sensors, sonar sensors, and/or LiDAR scanners or sensors 154, as examples. Inventive concepts are not limited to particular types of sensors. In various embodiments, sensor data from one or more of sensors 150, e.g., one or more stereo cameras 152 and/or LiDAR scanners 154, can be used to generate and/or update a 2-dimensional or 3-dimensional model or map of the environment, and sensor data from one or more of sensors 150 can be used for the determining location of AMR 100 within the environment relative to the electronic map of the environment.

Examples of stereo cameras arranged to provide 3-dimensional vision systems for a vehicle, which may operate at any of a variety of wavelengths, are described, for example, in U.S. Pat. No. 7,446,766, entitled Multidimensional Evidence Grids and System and Methods for Applying Same and U.S. Pat. No. 8,427,472, entitled Multi-Dimensional Evidence Grids, which are hereby incorporated by reference in their entirety. LiDAR systems arranged to provide light curtains, and their operation in vehicular applications, are described, for example, in U.S. Pat. No. 8,169,596, entitled System and Method Using a Multi-Plane Curtain, which is hereby incorporated by reference in its entirety.

In example embodiments, AMR 100 may include a user interface module 11 configured to control UI 111, including generating outputs and processing inputs of the UI 111. A user may use UI 111, under the control of UI module 11, to provide inputs at the AMR and communicated to supervisor 200, such inputs indicating a task is complete.

In various embodiments, supervisor 200 can be configured to provide instructions to and exchange data with AMR 100, and to monitor the navigation and activity of the AMR and other robotic vehicles 100-1, humans "H," all of which can be considered assets within the environment. Movements and functions of robotic vehicles and humans can be tracked and/or monitored by supervisor 200.

The AMR can include a communication module 160 configured to enable communications with supervisor 200 and/or any other external systems, such as other AMRs 100-1 and human's H with electronic devices. The communication module 160 can include hardware, software, firmware, receivers, and transmitters that enable communication with the supervisor 200 and any other external systems over any now known or hereafter developed communication technology and/or networks, such as various types of wireless technology including, but not limited to, Wi-Fi, Bluetooth, cellular, global positioning system (GPS), radio frequency (RF), and so on (collectively represented as network 190).

As an example, the supervisor 200 could wirelessly communicate a job to an AMR with path or route information to navigate the AMR through an environment to perform a task or series of tasks. The path can be relative to a map of the environment stored in memory and, optionally, updated from time-to-time, e.g., in real-time, from vehicle sensor data collected in real-time as AMR 100 navigates and/or performs its tasks. The sensor data can include sensor data from sensors 150 and/or other sensors in the environment, including sensors associated with supervisor 200, those of other AMRs, and/or humans with electronics devices. As an example, in a warehouse setting the path could include a plurality of stops along a route for the picking and loading and/or the unloading of goods. The path can include a plurality of path segments. The navigation from one stop to another can comprise one or more path segments. The supervisor 200 can also monitor the AMR 100, such as to determine robotic vehicle's location within an environment, battery status and/or fuel level, and/or other operating, vehicle or task performance status and information, and/or load parameters.

In accordance with aspects of the inventive concepts, a fleet management graphical user interface (GUI) can be provided that enables a user to configure jobs for AMRs that include stops at workspaces to perform tasks. In various embodiments, the GUI also allows the user to review status of AMRs, whether during job execution or sitting idle awaiting a job assignment. In some embodiments the fleet management GUI can enable a user to see status of workspace locations. In some embodiments the fleet management GUI can enable a user to see build jobs for execution by at least one AMR. The fleet management GUI may be generated by a fleet management module 220 of supervisor 200, forming a supervisor with fleet management functionality.

An environment within which AMRs operate can be a warehouse facility, or other material storage environment. The environment can include a plurality of spaces and infrastructure to store goods, e.g., palletized goods. Each job of an AMR represents a workflow where the AMR navigates a facility and performs tasks at one or more stops or locations along its route. The workflow can be designed by a human user via a user interface and then loaded on to the AMR for execution.

In various embodiments, the workspaces can be defined entities within a job building program used to build jobs for subsequent loading onto an AMR for execution. The environment can also include a variety of non-work spaces, such as queueing spaces and utility locations. Non-work spaces may not be assignable within the context of a workflow, but could be represented within the environment and visited by AMRs during workflow execution for various reasons. Queueing spaces can be designated spaces associated with defined workspace locations; AMRs can park at queueing spaces awaiting availability of an occupied location. In various embodiments, utility locations can have one or more of the following types: Taxi Stand, Charge Station, and/or Tech (or service) shop. In various embodiments, a taxi stand is a location where an AMR sits idle awaiting assignment of a job. In various embodiments, other utility locations could be defined. The definition of utility locations is not limited to the set described herein.

Workspace locations can be specified at the time of job configuration and then used by an AMR during runtime. Configuring the AMR includes loading job definition program code onto the AMR, e.g., wirelessly or otherwise, that is executable by the AMR to perform one or more tasks at one or more locations within the context of the defined job. Subsequently, performance data representing time spent at one or more workspaces and/or non-work spaces can be pulled or read from the AMR history data and analyzed via, for example, a fleet management GUI generated by a supervisor with fleet management functionality.

In accordance with aspects of the inventive concepts, a robotic vehicle at a queueing space is not available for assignment, since it has already been assigned a job and is awaiting access to a location associated with its queuing space. However, a mobile robot at a taxi stand is assignable, since it is idly awaiting a job. A mobile robot at a charging station or service area may or may not be available for a job, if it has not already been assigned a job. If it has already been assigned a job and has diverted for service or charging, it may resume its job after the stop. If it has not been assigned a job, it could be assigned a job in anticipation of availability after completion of the charging or service operation or it could remain unavailable until it navigates to a taxi stand, depending on the embodiment. In some embodiments, when an AMR is done being serviced or charged, the utility location could then serve as a taxi stand where the AMR sits awaiting assignment, for example, if there is no other contention for the utility location. If there is contention for the utility location, the AMR can be instructed to proceed to a taxi stand. The movement of the AMR and use and management of utility locations can be managed by the fleet management system and/or supervisor.

Utility locations represent non-work states of an AMR. In some embodiments, AMRs can be directed to utility locations by the supervisor, which monitors AMRs. In some embodiments, navigation to utility locations, as entities within the environment, can be pre-planned in non-work states of an AMR, e.g., using fleet management functionality. In various embodiments, the inventive concepts can include:

- Conceptual modeling of non-work states, including non-work time and place for the robotic vehicle, e.g., an AMR.
- Establishment of consistent and intentional patterns for mobile robots (e.g., AMRs) and a fleet of mobile robots utilization of downtime and place.
- Visualization of this non-work state, non-work time and place, for the mobile robots in the system.
- Expose human operators to mobile robot or fleet of mobile robots availability for work and performance.

In various embodiments, by treating non-working states, including time and place, with equal importance to working states, the system is able to maximize efficiency and user experience of the automation system.

Figure 3:
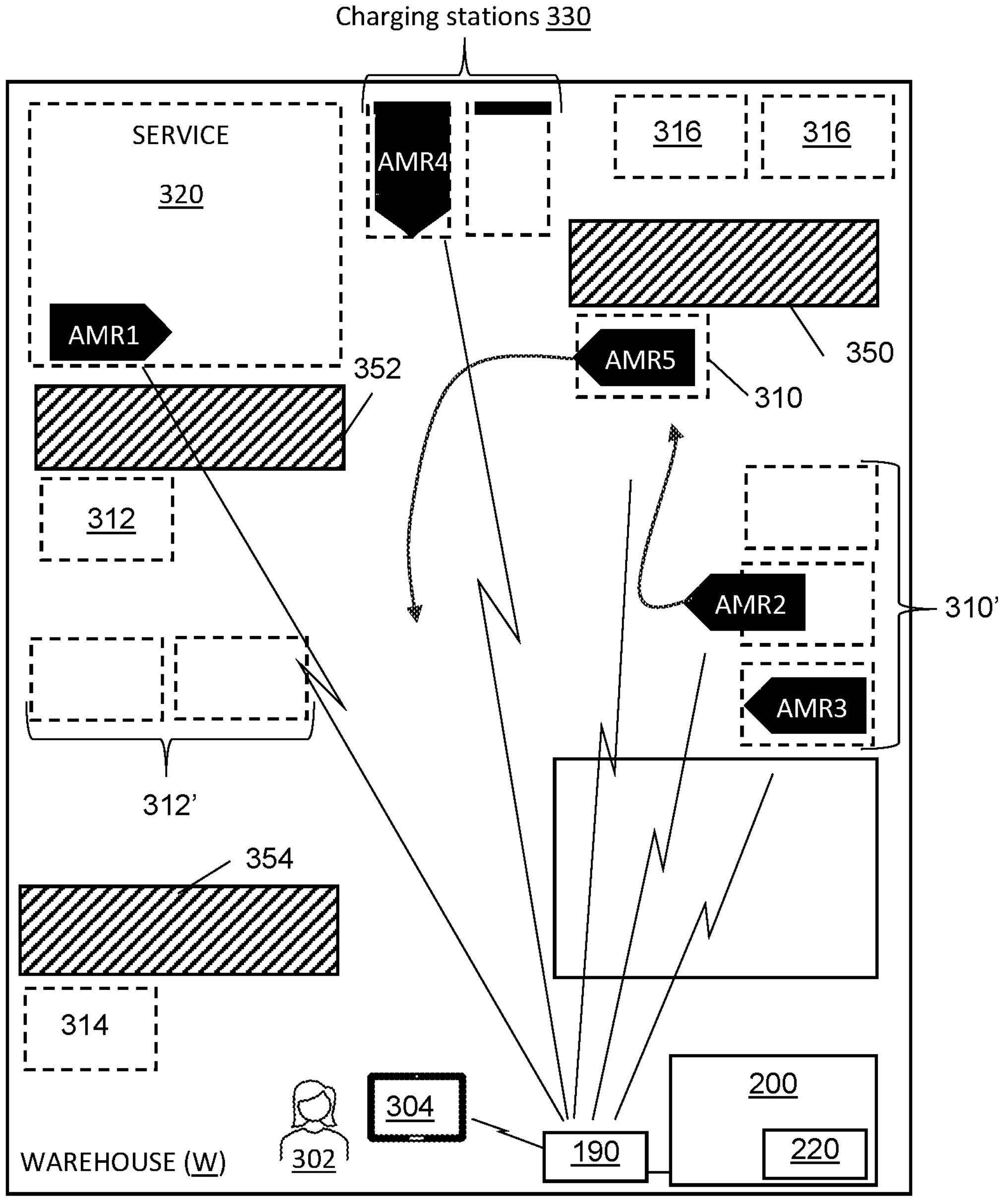
FIG. 3 illustrates an example of warehouse environment comprising utility locations sued by AMRs, in accordance with aspects of inventive concepts.

FIG. 3 illustrates an example of warehouse environment W comprising a plurality of locations used by a plurality of AMRs, in accordance with aspects of inventive concepts. AMRs can communicate with supervisor 200, including fleet management module 220, via network 190 in performance of jobs within the warehouse. A job can include one or more tasks at one or more locations to be performed by an AMR navigating through the environment.

An operator 302, e.g., a human user H from FIG. 2, can operate a handheld device 304 or other computer device having a UI configured to present the fleet management GUI display driven by the fleet management module of supervisor 200. The fleet management GUI on device 304 can be configured to display metrics around performance of one or more AMRs, enabling a user 302 to see how much time an AMR was actively working and also how much time it was sitting idle at queuing spots. In most cases, the supervisor automatically finds and assigns free AMRs to new jobs that are created. A user does not need to do that, a user can just trigger a job via device 304 and the supervisor will look through all the AMR statuses and choose the AMR that makes the most sense for the job. In some embodiments, the supervisor can generate a view that can be viewed via device 304 showing a list of a state each of the AMRs in a fleet, e.g., actively working, idle at Taxi Stand, error state, offline, etc.

In the embodiment of FIG. 3, a plurality of workspaces 310, 312, 314. Workspace 310 is arranged to drop or pick goods to/from storage apparatus 350; workspace 312 is arranged to drop or pick goods to/from storage apparatus 352; and workspace 314 is arranged to drop or pick goods to/from storage apparatus 354. These locations 310, 312, 314 can be added into a job during a job build process.

Some of the workspace locations include associated queueing or parking spaces. Conceptually, these spaces are not part of a job or route, they are part of a location. If a job tells a robot to go to specified location in an executing job and that location is already occupied by another AMR, the AMR will query the supervisor to see if there are any queueing spaces associated with the specified location and park the AMR in a designated queuing space until the specified location 12 becomes available. In other words, in various embodiments, jobs are not built to direct an AMR to stop and queue at a queueing; jobs are created to instruct an AMR to go to a location 12 and if the location is not available, the supervisor will automatically direct the AMR to an associated queueing space to prevent a traffic jam.

In the embodiment of FIG. 3, workspace location 310 includes three queueing spaces 310' and workspace location 312 includes two queuing spaces 312'. In this embodiment, workspace location 314 does not include any queue spaces.

In FIG. 3, AMR5 occupies workspace location 310. AMR2 requested workspace location 310 and then AMR 3 requested workspace location 310. With workspace location 310 occupied, supervisor 200 has directed AMR 2 to a queueing space 310' and then AMR3 to a queueing space. When AMR5 leaves workspace location 310, AMR2 will exit queueing space 310' to next occupy workspace location 310. AMR 3 will remaining the queueing space 310' until supervisor 200 signal that workspace location 310 is available, meaning AMR2 has exited workspace 310.

In addition to workspace locations 310, 312, 314 and queuing spaces 310', 312', the warehouse W may also include other types of non-work spaces. Non-work spaces are spaces not intended for task performance as part of a job. Rather, for example, non-work spaces can include "taxi stands" 316, which are spaces an AMR can sit idly awaiting a next task. The supervisor can wirelessly communicate with all of the AMRs and monitor their statuses, assign a job, and/or instruct navigation to a non-work location. New jobs can be preconfigured as a job file that is communicated by supervisor 200 to an AMR in a taxi stand 316. The AMR then executes the job file to perform a workflow.

In this example, AMR1 sits in a non-work service center 320 and AMR4 is at a charging station 330. Once AMR4 has completed its charging task, it can be instructed, e.g., by supervisor 200 to navigate to a next task or to a taxi stand to await further taskings. If AMR1 and AMR5 are not engaged in job performance, they can be directed by supervisor 200 to a taxi stand 316 to await a job assignment. Otherwise, these stops can be based on the state of the AMR, e.g., in response to a need for service or a need for a battery charge, as examples.

The supervisor can make status of each AMR available via a GUI, for example via device 304 and/or a UI 111 of an AMR. In various embodiments, the status can show the state of each of a plurality of AMRs, including location and whether it is engaged in a task, idle, or in a queueing space. The status can be provided in a list format or a graphical format depicting AMRs within the warehouse, as in FIG. 3.

By treating non-working state, at a time and place, with equal importance to work states, where workflow tasks are performed, the inventive concepts are able to maximize efficiency, and user experience of the automation system. A visualization of mobile robot availability for work state across a fleet of mobile robots makes it possible for human operators to collaborate with robotic vehicles to get work done in a hybrid environment, with human operators and AMRs collaborating.

Figure 4:
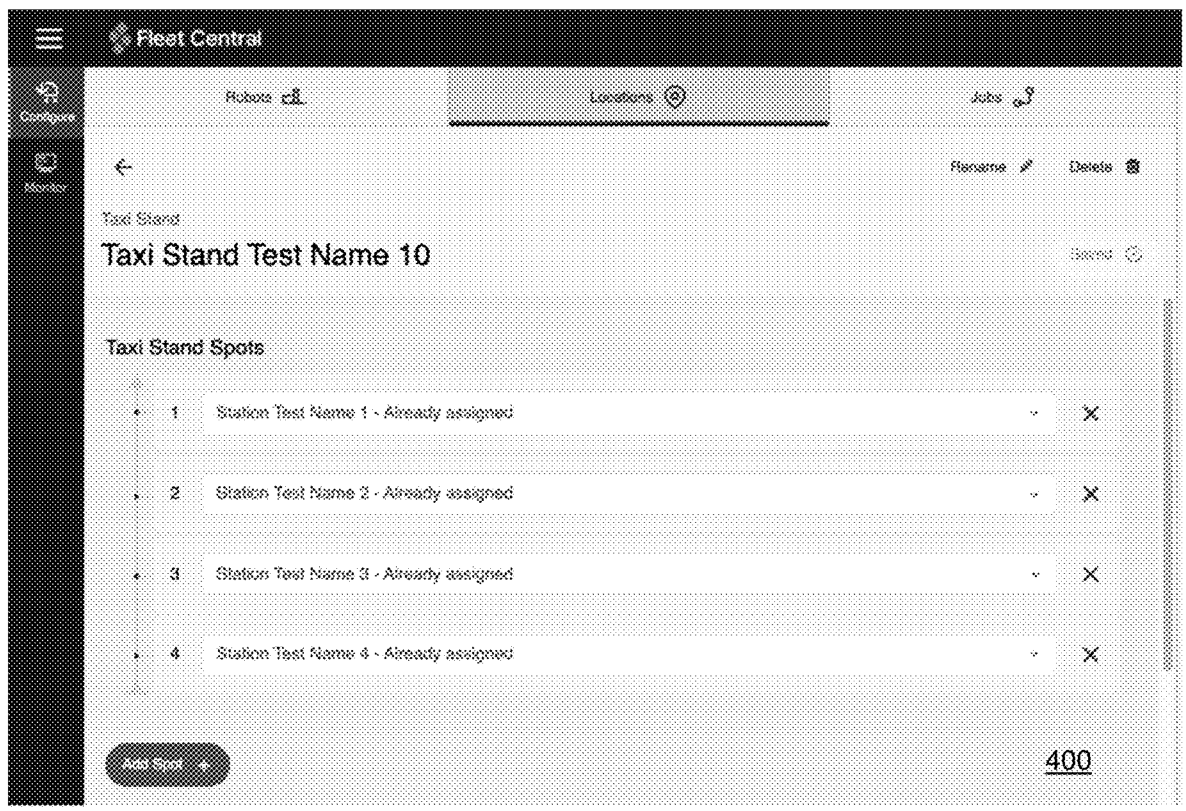
FIG. 4 illustrates an example of a user interface, in accordance with aspects of the inventive concepts.

FIG. 4 illustrates an example of a user interface 400, e.g., a fleet management GUI provided by supervisor 200, that depicts a list of taxi stands and their statuses as assigned or available, in accordance with aspects of the inventive concepts. Additionally, in some embodiments, the supervisor 200 allows non-work spaces to be defined within the environment, e.g., see the "Add Spot +" option in FIG. 4, which allows a new taxi stand, e.g., queueing space, to be added in association with a defined workspace location. As indicated, taxi stand spots can also be deleted, by choosing the "X" to the right of the defined space.

In some embodiments, queueing spaces 310' can be defined and associated with workspace location 310 within the supervisor 200. The queueing spaces need not be selectable as part of a job configuration, their use can be ad hoc based on whether or not a location is occupied. In some embodiments, the other non-workspaces, 320 and 330 in FIG. 3 can be defined within the environment. Those spaces can also be used in an ad hoc manner, dependent on the status, or need, of the AMR.

Figure 5:
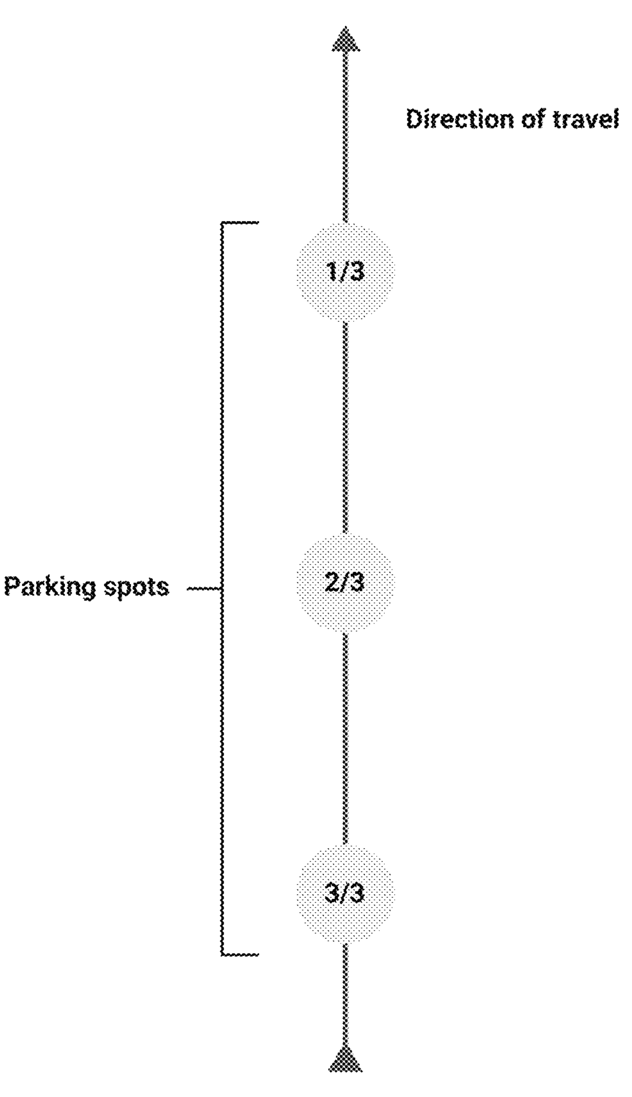
FIG. 5 depicts a set of parking spaces or spots associated with a location, in accordance with aspects of the inventive concepts.

FIG. 5 depicts a set of parking spaces or spots associated with a location, in accordance with aspects of the inventive concepts. As with location 310 and its queueing spaces 310' in FIG. 3, there are three parking spaces, 1/3, 2/3, 3/3 associated with a workspace location. Any one of the three spaces can be assigned to an AMR as a queueing space when the workspace is requested by the AMR, but is occupied by another AMR.

Figure 6:
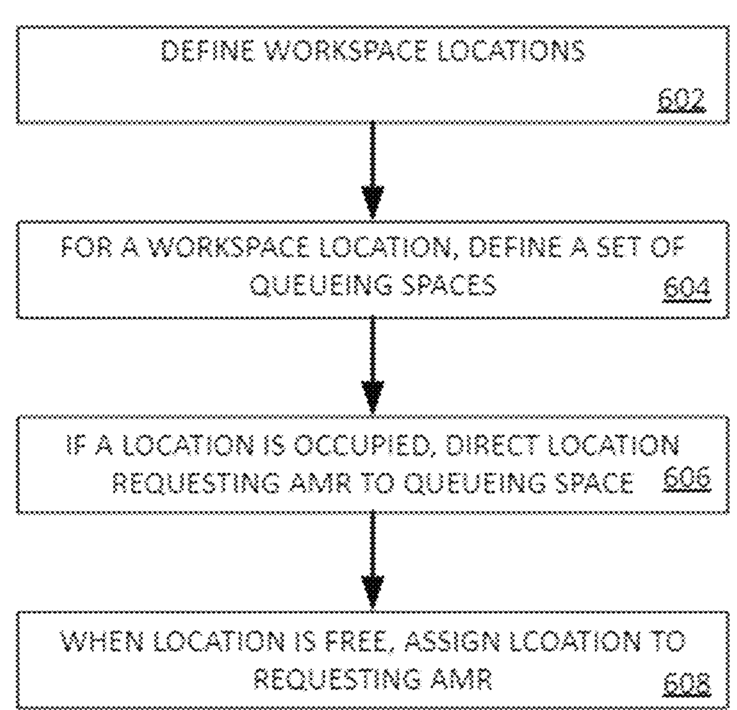
FIG. 6 depicts an embodiment of a method of defining and utilizing queueing spaces associated with a location, in accordance with aspects of the inventive concepts.

FIG. 6 depicts an embodiment of a method 600 of defining and utilizing queueing spaces associated with a location, in accordance with aspects of the inventive concepts. The method can be performed by the supervisor 200 with fleet management module 220. In step 602, workspace locations are electronically defined, and assignable in job building. A workspace location is a physical location within an environment where a workflow task can be performed. In step 604, for at least one location, a set of queueing spaces are defined. Queueing spaces are spaces associated with the location. In step 606, an AMR requests access to a location and if the location is occupied, the supervisor instructs the requesting AMR to wait in a queueing space, which can be assigned by the supervisor. Queueing spaces are not built into the job, they are only used if needed when a job location is not available. In step 608, when the supervisor is signaled that the location is no longer occupied, the prior AMR has left, the supervisor grants access to the location to the requesting AMR. This can be accomplished for a plurality of locations within the environment.

Systems and methods in accordance with the inventive concepts provide for visualization of robot availability for work state across a fleet of robot that makes it possible for human operators to collaborate with robots to get work done in a hybrid environment. In preferred embodiments, the functionality lives at the supervisor (or FMS) and when a mobile robot gets to a planned location and the location is unavailable, the supervisor can direct the mobile robot to an associated "parking spot" until the requested location becomes available.

Parking spots are not locations in and of themselves, but rather constituent parts of defined locations, they can be a sort of modular feature that is included in locations where this kind of traffic management (holding/advancing robots down parking spots) is desired. The inventive concepts prevent traffic jams from occurring when one robot tries to advance to a location that is already occupied by another robot. The parking spots are not considered locations and an operator could not create a job that says "Send robot to parking spot 3"—they are merely child attributes of a defined location. When a robot requests access to location 3 via a job, the supervisor will respond with instructions to park at a queuing spot if not available or grant access if available. In that way the traffic management functionality is embodied within the location and handled by the supervisor.

The inventive concepts can be implemented as part of a total automated mobile robot (AMR) fleet management system (FMS), which can take the form of a total package of hardware, software and integrations that allows a customer to establish material flow automation in their facility. The aspects of visualizing and sharing non-work idle states to users allows the customer to maximize the return on investment from their fleet and supervisor/fleet management system.

While the foregoing has described what are considered to be the best mode and/or other preferred embodiments, it is understood that various modifications can be made therein and that aspects of the inventive concepts herein may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can combined in any given way.

Below follows an itemized list of statements describing embodiments in accordance with the inventive concepts:

1. A system, comprising:

a management system comprising at least one processor configured to define a set of queueing spaces associated with a workspace location for each of a plurality of locations; and in response to a request by an autonomous mobile robot (AMR) for access to the location, the management system is configured to grant access to the requesting AMR if the location is unoccupied or direct the requesting AMR to a queueing space associated with the location if the location is occupied by another AMR.

2. The system of statement 1, or any other statement of combination of statements, wherein the management system is further configured to, in response to a signal indicating the location has been exited by the other AMR, send instructions to the requesting AMR granting access to the location.

3. The system of statement 1, or any other statement of combination of statements, wherein the locations are within a warehouse environment and include drop and pick locations.

4. The system of statement 1, or any other statement of combination of statements, wherein the management system is configured to generate computer displays showing status of queuing spaces as being assigned or available.

5. The system of statement 1, or any other statement of combination of statements, wherein the management system is configured to generate computer displays enabling creation of the set of queueing spaces in association with the location.

6 The system of statement 1 or 5, or any other statement of combination of statements, wherein the management system is configured to generate computer displays enabling creation of the set of utility locations.

7. The system of statement 6, or any other statement of combination of statements, wherein the utility locations include charging stations, service areas, and non-work idling areas.

8. The system of statement 6, or any other statement of combination of statements, wherein the management system is configured to generate computer displays showing status of utility locations.

9. A method, comprising:

a management system comprising at least one processor executing program code to manage traffic at workspace locations, including:

defining a set of queueing spaces associated with a workspace location for each of a plurality of locations; and in response to a request by an autonomous mobile robot (AMR) for access to the location, granting access to the requesting AMR if the location is unoccupied or directing the requesting AMR to a queueing space associated with the location if the location is occupied by another AMR.

10. The method of statement 9, or any other statement of combination of statements, further comprising, in response to a signal indicating the location has been exited by the other AMR, sending instructions to the requesting AMR granting access to the location.

11. The method of statement 9, or any other statement of combination of statements, wherein the locations are within a warehouse environment and include drop and pick locations.

12. The method of statement 9, or any other statement of combination of statements, further comprising generating computer displays showing status of queuing spaces as being assigned or available.

13. The method of statement 9, or any other statement of combination of statements, further comprising generating computer displays enabling creation of the set of queueing spaces in association with the location.

14. The method of statement 9 or 13, or any other statement of combination of statements, further comprising generating computer displays enabling creation of the set of utility locations.

15. The method of statement 14, or any other statement of combination of statements, wherein the utility locations include charging stations, service areas, and non-work idling area.

16. The method of statement 14, or any other statement of combination of statements, further comprising generating computer displays showing status of utility locations.

17. A computer program product stored in a computer memory and executable by at least one processor to perform a method comprising:

defining a set of queueing spaces associated with a workspace location for each of a plurality of locations; and in response to a request by an autonomous mobile robot (AMR) for access to the location, granting access to the requesting AMR if the location is unoccupied or directing the requesting AMR to a queueing space associated with the location if the location is occupied by another AMR.

18. The computer program product of statement 17, or any other statement of combination of statements, further comprising, in response to a signal indicating the location has been exited by the other AMR, sending instructions to the requesting AMR granting access to the location.

19. The computer program product of statement 17, or any other statement of combination of statements, wherein the locations are within a warehouse environment and include drop and pick locations.

20. The computer program product of statement 17, or any other statement of combination of statements, further comprising generating computer displays showing status of queuing spaces as being assigned or available.

21. The computer program product of statement 17, or any other statement of combination of statements, further comprising generating computer displays enabling creation of the set of queueing spaces in association with the location.

22. The computer program product of statement 17 or 21, or any other statement of combination of statements, further comprising generating computer displays enabling creation of the set of utility locations.

23. The computer program product of statement 22, or any other statement of combination of statements, wherein the utility locations include charging stations, service areas, and non-work idling area.

24. The computer program product of statement 22, or any other statement of combination of statements, further comprising generating computer displays showing status of utility locations.

What is claimed is:

1. A system, comprising:

a management system comprising at least one processor configured to define one or more non-workspace locations, comprising a set of first queueing spaces associated with a first workspace location, for each of a plurality of workspace locations, wherein:

in response to a request by an autonomous mobile robot (AMR) for access to the first workspace location, the management system is configured to grant access to the requesting AMR if the first workspace location is unoccupied or direct the requesting AMR to a first queueing space associated with the first workspace location if the first workspace location is occupied by another AMR.

2. The system of claim 1, wherein the management system is further configured to, in response to a signal indicating the first workspace location has been exited by the other AMR, send instructions to the requesting AMR granting access to the first workspace location.

3. The system of claim 1, wherein the plurality of workspace locations are within a warehouse environment and include drop and pick locations.

4. The system of claim 1, wherein the management system is configured to generate computer displays showing status of queuing spaces as being assigned or available.

5. The system of claim 1, wherein the management system is configured to generate computer displays enabling creation of the set of first queueing spaces in association with the first workspace location.

6. The system of claim 1, wherein the management system is configured to generate computer displays enabling creation of a set of utility locations.

7. The system of claim 6, wherein the utility locations include charging stations, service areas, and non-work idling areas.

8. The system of claim 6, wherein the management system is configured to generate computer displays showing status of utility locations.

9. A method, comprising:

a management system comprising at least one processor executing program code to manage traffic at workspace locations, including:

defining a set of first queueing spaces associated with a first workspace location for each of a plurality of workspace locations; and in response to a request by an autonomous mobile robot (AMR) for access to the first workspace location, granting access to the requesting AMR if the first workspace location is unoccupied or directing the requesting AMR to a first queueing space associated with the first workspace location if the first workspace location is occupied by another AMR.

10. The method of claim 9, further comprising, in response to a signal indicating the first workspace location has been exited by the other AMR, sending instructions to the requesting AMR granting access to the first workspace location.

11. The method of claim 9, wherein the plurality of workspace locations are within a warehouse environment and include drop and pick locations.

12. The method of claim 9, further comprising generating computer displays showing status of queuing spaces as being assigned or available.

13. The method of claim 9, further comprising generating computer displays enabling creation of the set of first queueing spaces in association with the first workspace location.

14. The method of claim 9, further comprising generating computer displays enabling creation of a set of utility locations.

15. The method of claim 14, wherein the utility locations include charging stations, service areas, and non-work idling area.

16. The method of claim 14, further comprising generating computer displays showing status of utility locations.

17. A computer program product stored in a computer memory and executable by at least one processor to perform a method comprising:

defining a set of first queueing spaces associated with a first workspace location for each of a plurality of workspace locations; and in response to a request by an autonomous mobile robot (AMR) for access to the first workspace location, granting access to the requesting AMR if the first workspace location is unoccupied or directing the requesting AMR to a first queueing space associated with the first workspace location if the first workspace location is occupied by another AMR.

18. The computer program product of claim 17, further comprising, in response to a signal indicating the first workspace location has been exited by the other AMR, sending instructions to the requesting AMR granting access to the first workspace location.

19. The computer program product of claim 17, wherein the plurality of workspace locations are within a warehouse environment and include drop and pick locations.

20. The computer program product of claim 17, further comprising generating computer displays showing status of queuing spaces as being assigned or available.

21. The computer program product of claim 17, further comprising generating computer displays enabling creation of the set of first queueing spaces in association with the first workspace location.

22. The computer program product of claim 17, further comprising generating computer displays enabling creation of a set of utility locations.

23. The computer program product of claim 22, wherein the utility locations include charging stations, service areas, and non-work idling area.

24. The computer program product of claim 22, further comprising generating computer displays showing status of utility locations.

25. The system of claim 1, wherein the one or more non-workspace locations further comprise a set of utility locations separate from any of the plurality of workspace locations.

* * * * *